3,070,462
PROTECTIVE WRAPPING MATERIALS
Albert L. McConnell, Chester, and Stewart W. Morse, Jr., Media, Pa., assignors to Scott Paper Company, Chester, Pa., a corporation of Pennsylvania
No Drawing. Filed Mar. 20, 1959, Ser. No. 800,664
5 Claims. (Cl. 117—138.8)

The present invention relates to protective wrapping materials and more particularly to modifications of the polyolefinic films whereby to improve their utility and applicability to protective wrappings.

Many flexible film materials have achieved commercial success in the area of protective wrappings. For example, waxed papers, plastic coated papers, aluminum foil, and the thermoplastic organic resin films such as polyethylene and polyvinylidene chloride, are widely used in most households as well as in the processing departments of retail stores. Although each of these materials possesses specific advantageous characteristics adapting it to a particular application or applications, none has the balance of characteristics which would be required of a universally applicable product.

Waxed papers have relatively high vapor transmission properties, particularly after they have been creased, and so are of little value as wrappings for foodstuffs subject to prolonged periods of storage. Similarly papers coated with plastic generally exhibit high vapor transmissions, while metal foils are not self-sealing, and both types of products are also quite expensive.

The flexible films of thermoplastic organic resins, such as polyvinylidene chloride, polypropylene, polybutylene and in particular polyethylene have relatively low vapor transmission properties, are resistant to mechanical and chemical deterioration and since they are readily extruded, cast or calendared into thin shets have found widespread acceptance for many packaging applications.

Most of the thermoplastic organic resin films, however, lack permanent moldability, are subject to in-roll "blocking" or adherence upon superimposition and exhibit high electrostatic propensities which not only affects film handling but also occasions excessive attraction of particles of foreign matter.

It is an object of our invention to provide a surface modification for polyolefinic films, improving the utility thereof as a re-usable wrapping material, which modification does not detract from the inherent characteristics of the films, and in fact improves certain of those characteristics as for example, effecting a lowering of the in-roll "blocking" tendencies of such films.

It is a further object of the present invention to provide a surface-modified polyolefinic film in which material transparency remains unimpaired.

Other objects and advantages of our invention will be readily apparent from the following detailed description of several preferred embodiments thereof.

Briefly stated, the present invention contemplates a light gauge, transparent polyolefin film, particularly a polyethylene film having a thickness of from 0.5 to 0.7 mil surfaced with a thin coating layer of an adherent, non-evaporating liquid which surfacing modifier is substantially inert with respect to the base polyolefin.

The polyolefin film susceptible of improvement by the surface modification of our invention is readily prepared by processes well known to the art. For example, extrusion of the thermoplastic organic resin onto a chill roll, to secure polished surfaces on a film having a thickness of from 0.5 to 0.7 mil is a conventional operation and has been used particularly in association with polyethylene resins, such as the "Alathon 34" of Du Pont. Polypropylene and polybutylene resins similarly lend themselves to the formation of light gauge films many of which will be clear and transparent and all of which are receptive of surface coating as contemplated by the present invention.

Many types of surfacing modifiers may be used in formulating coating compositions for application to the polyolefin films. The polyols, including dihydric alcohols, such as ethylene glycol, propylene glycol, butylene glycol; trihydric alcohols of which glycerol is typical, or the higher polyhydric alcohols which are liquids or which, as in the case of the hexahydric alcohols, sorbitol and mannitol may be dissolved in water to form a heavy syrup, serve especially well as surfacing modifiers in as much as they do not crystallize at low temperatures nor vaporize to an objectionable degree at elevated temperatures. Furthermore these polyols are substantially inert with respect to the polyolefin films to the extent that they neither soften such films nor occasion a swelling thereof.

At the same time, however, monohydric alcohols of the aliphatic series, having in excess of 6 carbon atoms in the nucleus, which are liquid at ordinary temperatures and which have a boiling point above 175° C. have been observed to have the higher viscosities and low vapor pressures ordinarily associated with the polyols, thus adapting them for satisfactory use as surfacing modifiers for polyolefin films.

Another class of surface modifiers which has been successfully employed to coat polyolefin films is composed of the liquid glyceryl esters of the high molecular weight fatty acids, the well-known group of vegetable oils, including peanut, olive, cottonseed, coconut and castor oils. The normal properties of these vegetable oils qualify them fully as components of persistent coating formulations, as do the properties of mineral oil and the so-called silicone oils.

A characteristic trait of the polyolefin films, however, is their resistance to wetting by most types of liquids and in particular the several types of surface modifiers which have been set out hereinbefore. It is necessary, therefore, in order to compensate for this wetting resistance to combine with the surface modifier a wetting agent or surfactant which will diminish interfacial tensions and enhance the spreading action of the coating formulation to the end that a substantially uniform layer of film modifier will be distributed across the surface of the polyolefin film. Manifestly the wetting agent or surfactant should be inert with respect to the base polyolefin film to avoid alteration of the physical structure thereof. We have established the efficacy of non-ionic, cationic and anionic surfactants, including the polyoxyalkylene derivatives of long chain fatty acid esters, the "Tween" and "Span" products of Atlas Powder Company and sodium dioctyl sulfosuccinate, the "Aerosol OT" of American Cyanamid, in combination with the identified surface modifying agents for coating polyolefin films. In fact it has been observed that certain of these surfactants, the Tween and Span derivatives which are basically esters of a long chain fatty acid (lauric acid) and a polyhydric alcohol (sorbitan) may serve in themselves as surface modifiers.

A diluent is advantageously employed in the coating formulations for reduction of consistency thereof to the point that a thin layer of the modifying agent will be evenly distributed over the surface of the base film. The diluent may be a solvent for the modifying agent, or in the case of certain coating agents it is preferred that the diluent serve merely as a vehicle in which the other components of the formulation may be dispersed as an emulsion. Because of the many products that can be used both as coating agents and as diluents, it is not possible to list all the suitable combinations. Data are available to those skilled in the art to determine the solvents available for the coating agents, also in the use of diluents to make dispersed emulsions. However, the diluents used must exhibit adequate volatility to permit their removal from the base film for concentration of the residual coating component thereon. Such residual coatings should not leave toxic residues and as has been indicated should not react objectionably with the base film. Diluents which have been successfully employed in products of our invention are, for example, water, aqueous ethyl alcohol, aqueous methyl alcohol and the like.

Our inventive concept is presented in more detail in the following examples which are intended merely to be illustrative of and not as limitations on the invention.

*Example I*

A preferred example of the present invention utilizes a sheet of clear polyethylene film .5 mil in thickness which is dip coated by passing through a coating composition comprising 0.8 part by weight of glycerol, 0.4 part by weight of a 50/50 mixture of polyethyleneoxide sorbitan monolaurate (Tween 20, a product of Atlas Powder Company) and sorbitan monolaurate (Span 20, Atlas Powder Company) dispersed in an aqueous solution of 98.8 parts by weight of water. The applied coating is "doctored-off" by squeezing action in the nip of two rubber rolls which have a hardness of 60 Shore A durometer and are applied at a pressure of 3.75 pounds per linear inch. The coated film is advanced at a web speed of 75 lineal feet/minute into a heated, air circulating, drying chamber controlled within a temperature range of 150° to 170° F. and a relative humidity within 2 to 5 percent. Upon advancing beyond the drying chamber the coating mixture has been volatilized to such an extent that only a residual layer of non-evaporating coating materials remains, namely, the glycerol and surfactant materials. This residual coat in which the glycerol is present in an amount of about 10 milligrams per square meter of film surface is non-crystalline in nature, non-evaporating, non-swelling to the polyethylene film and is distributed uniformly over the film surface, in immediate contact therewith.

*Example II*

The procedure of Example I was repeated applying the following ingredients:

1.60 parts by weight of glycerol
0.40 part by weight of a 50/50 mixture of Tween 20 and Span 20
98.0 parts by weight of water in admixture to a clear polyethylene film 0.7 mil in thickness. Again, the coated film, after drying, presented adherent liquid surface layers with the glycerol being present in an amount of about 16.0 milligrams per square meter of film surface.

*Example III*

A coating composition consisting of:

1.01 parts by weight of sorbitol
0.17 part by weight of a 50/50 mixture of Tween 20 and Span 20
98.82 parts by weight of aqueous ethanol (80% concentration)

was applied to a clear polypropylene film 0.5 mil in thickness. The coated film product retained its transparency and although carrying adherent liquid surface layers in which the sorbitol amounted to about 10.0 milligrams per square meter of film surface was non-greasy to the touch. When converted into roll form, the material was easily dispensed therefrom without objectionable blocking.

*Example IV*

A coating composition consisting of:

1.13 parts by weight of ethylene glycol
0.47 part by weight of a 50/50 mixture of Tween 20 and Span 20
98.4 parts by weight of aqueous methanol (2% concentration)

was applied to a clear polyethylene film of 0.5 mil in thickness. The coated film product again retained its transparency and the adherent liquid surface layers in which the ethylene glycol amounted to about 12 milligrams per square meter of film surface imparted to the product a contact adhesiveness for smooth surfaces. The product was free of objectionable odors.

Polyolefin films below 1 mil in thickness may be coated with formulations based upon the other classes of surfacing modifiers to which reference has been made with results comparable to those set forth in the foregoing examples. Tests have demonstrated that such surfacing modifiers establish persistent fluid coating layers upon polyolefin film surfaces and impart to such films a self-adhering "cling-like" property.

As is apparent from the foregoing examples, a satisfactory manner of application of the surface modifying coatings is from a dip bath. However, other procedures including spraying, roll or brush coating or doctor blading will serve equally as well. Manifestly, the coating process employed can affect the amount of material which is applied to the polyolefin film and variations in the coating compositions will, in some cases, be required in order that the components in the residual liquid layer will range from approximately 6 to 24 milligrams per square meter of film surface with the glycerol, polyol or other modifying agent ranging from 4 to 16 milligrams per square meter of film surface.

The use of the transparent protective wrapping material of the present invention may be illustrated by the wrapping of a foodstuff such as a wedge of cheese. A cheese section of irregular shape is placed upon a treated surface at the approximate center of a sheet of our wrapping material which is of sufficient area so as to encompass entirely the cheese section with a moderate overlap. Any two opposing ends of the wrapping material are then folded over the cheese so that an overlap of one end is superposed upon the opposite end and pressed to effect an adhering bond. The remaining ends of the wrapping material are then folded inwardly, fitted to conform to the irregular marginal portions of the cheese section by molding the extending "tail" ends of the wrapping material as dictated by the configuration of the cheese section and pressed to bond. The sealed wrapping as thus described may be broken by simply reversing the above procedure. Furthermore, the process of wrapping and unwrapping may be repeated as desired without failure of the moldability and self-adhering characteristics of our transparent protective wrapping material.

It will at once be obvious that various changes to and modifications in the foregoing description of the preparation of a coated wrapping material and utilization of such product are possible without departing from the nature or the spirit of the invention as set forth in the appended claims.

What we claim is:

1. A clear, conformable, plastic, film of a polymerized olefin bearing upon its surfaces a thin, persistent coating layer of a liquid surface modifying agent selected from the group consisting of aliphatic monohydric alcohols having in excess of 6 carbon atoms in the nucleus, polyhydric alcohols, esters of long chain fatty acids, and oils in admixture with a surfactant, said coating imparting a regenerative self-adherence to the film.

2. A clear, conformable, plastic, film, of a polymeric ethylene bearing upon its surfaces a thin, persistent coating layer composed of a liquid polyhydric alcohol in admixture with a surfacant, said polyhydric alcohol being present in an amount of from 4 to 16 milligrams per square meter of film surface and imparting a regenerative self-adherence to the film.

3. A clear, conformable plastic, film of polyethylene bearing upon its surfaces a thin, persistent coating layer composed of glycerol in combination with a polyoxyalkylene derivative of a long chain fatty acid ester and a long chain fatty acid ester surfactant mixture, said glycerol being present in an amount of from 4 to 16 milligrams per square meter of film surface and imparting a regenerative self-adherence to the film.

4. A polyethylene film as defined in claim 3 in which the film is of a thickness between 0.5 and 0.7 mil.

5. A polyethylene film as defined in claim 3 in which the film is of a thickness between 0.5 and 0.7 mil and the glycerol layer contains polyoxyethylene sorbitan monolaurate in admixture with sorbitan monolaurate.

References Cited in the file of this patent

UNITED STATES PATENTS

| | | |
|---|---|---|
| 1,570,077 | Pitman | Jan. 19, 1926 |
| 2,393,863 | Myers | Jan. 29, 1946 |
| 2,628,176 | Simon et al. | Feb. 10, 1953 |
| 2,665,443 | Simon et al. | Jan. 12, 1954 |
| 2,670,308 | Groff et al. | Feb. 23, 1954 |
| 2,870,043 | Wolinski | Jan. 20, 1959 |